(No Model.)

J. DOUGLASS.
METALLIC HUB.

No. 287,645. Patented Oct. 30, 1883.

Witnesses:
John A. Ellis
Alb. Steiger

Inventor:
John Douglass
By David A. Burr
Attorney

UNITED STATES PATENT OFFICE.

JOHN DOUGLASS, OF BROOKLYN, NEW YORK.

METALLIC HUB.

SPECIFICATION forming part of Letters Patent No. 287,645, dated October 30, 1883.

Application filed April 10, 1883. (No model.)

*To all whom it may concern:*

Be it known that I, JOHN DOUGLASS, of the city of Brooklyn, county of Kings, and State of New York, have invented a new and useful Improvement in Metallic Hubs; and I do hereby declare that the following is a full and exact description thereof, reference being had to the accompanying drawings, and to the letters of reference marked thereon, making a part of this specification.

My invention relates to that class of hubs for vehicles which are constructed of metal.

It consists of a shell or hollow body of metal cast all in one piece, and re-enforced and completed by detachable journal-boxes at each end. The shell is formed with an outer central encircling recess divided by cross-partitions into sockets adapted to receive and engage the inner ends of the spokes. It is re-enforced to constitute a complete hub by means of separate journal-boxes driven into each end of the shell, and adapted to form bearings for the axle, leaving an interposed central lubricating-chamber to encircle the same.

The object of my invention is to produce at a low cost a strong, durable hub whose bearing-surfaces may be readily removed and replaced at a comparatively trifling expense without disturbing the wheel, and in which provision is made for its automatic lubrication.

Figure 1:
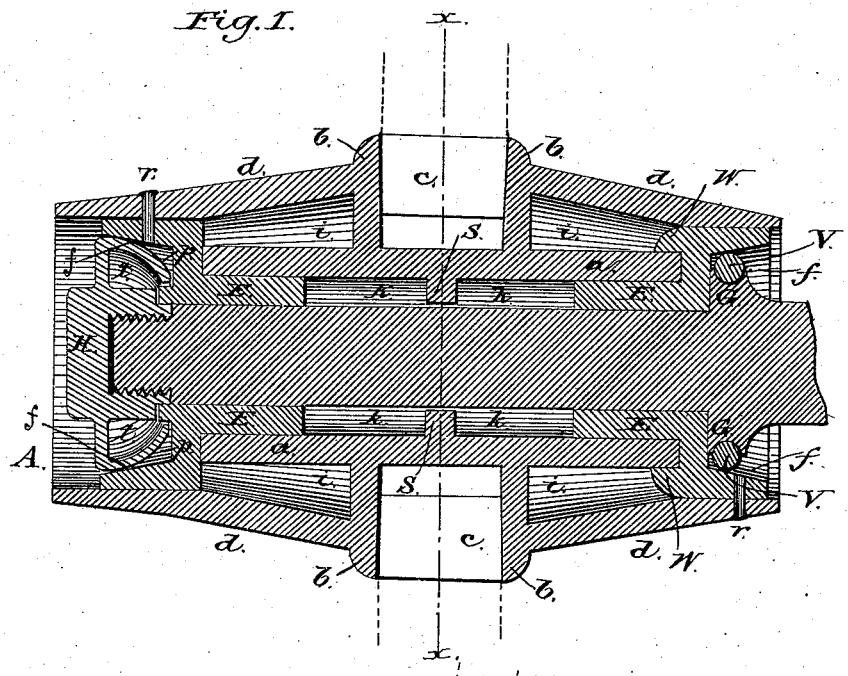
Figure 2:
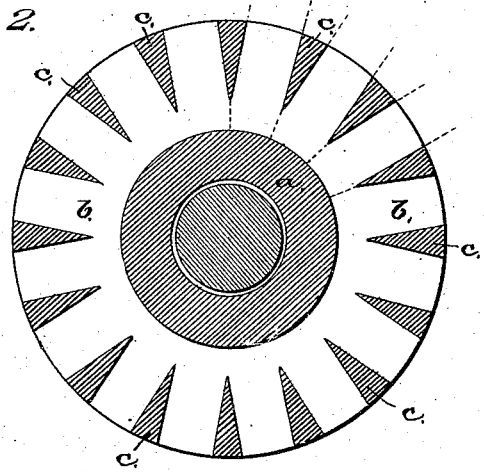

In the accompanying drawings, Figure 1 is a longitudinal section of my improved hub, and Fig. 2 a central transverse section in line $x\ x$ of Fig. 1.

A represents the metallic shell constituting the body of the hub. This shell is made in one casting, and consists of a central cylindrical box, $a$, encircled by two radial flanges, $b\ b$, connected at regular intervals by cross-pieces $c\ c$, wedge-shaped, so as to produce a series of rectangular openings or sockets between said flanges for the reception of the spokes. Annular plates $d\ d$ project from near the outer rim of each flange $b$ out beyond the ends of the cylindrical box $a$, concentrically therewith, but in tapering or conical form, as shown in Fig. 1, to constitute the outer surface of the hub. The inner surface of the outer end of each annular plate $b$ is made cylindrical from in line with the outer end of the inner box, $a$, outwardly, to serve as a seat for the outer end of the detachable journal-bearings which complete the hub. These bearings each consist of a cylindrical box, E, whose periphery is adapted to fit closely into the end of the inner cylindrical box, $a$, of the shell, and which is enlarged at its outer end to fit closely into the cylindrical seat in the outer end of the outer conical plate, $b$, of the shell, as shown in Fig. 1, being secured therein by a screw or rivet, $r$. The outer end of the journal-box is recessed at $f$ to receive the shoulder G of the axle at one end of the hub and its nut H at the other. These boxes E E, when forced or driven into the shell, support, connect, and unite the outer ends of its central cylindrical box and of its outer annular plates, and impart to the hub the necessary strength and solidity, the lightness and elasticity of the whole being maintained by means of the hollow spaces $i\ i$, inclosed therein. (See Fig. 1.) Additional support and strength are obtained in the connection of the journal-boxes with the body of the hub by forming an annular offset, W, upon the inner face of the enlarged portion of each, adapted to fit accurately with the opening between each end of the cylindrical box $a$ and the concentric annular plate $b$, encircling it. The journal-boxes are so proportioned in length as that when driven into the shell there will still remain an interval between them, forming an annular recess, $k$, in the center of the bore of the hub, for the reception and retention of suitable lubricating material. This annular recess is divided centrally by an annular flange, S, projecting inwardly from the middle of the box $a$, so as to very closely approach the axle, and to bear thereon in case of an unusual strain upon the hub tending to spring it out of line. So soon as the journal-boxes E E become worn, they may be driven out of the shell and replaced by new ones, leaving the main body of the hub intact. The nut H on the end of the axle is formed with an annular chamber, $t$, encircling its threaded seat, the outer wall of the chamber being made to project beyond the inner face of the nut into an annular recess, $p$, cut in the outer face of the journal-box, as shown in Fig. 1, so that any oil or grease escaping from the axle at the inner end of the nut H will pass into said chamber, instead of flowing out upon the nut.

A dust-ring, V, may be interposed between the shoulder of the axle and the recessed face of the inner journal-box, as shown in Fig. 1, to exclude all dust from the hub.

I claim as my invention—

1. The metallic hub constructed of a cylindrical box, a, radial flanges b b, and conical annular plates d d, cast all in one piece and inclosing the annular hollow spaces i i, in combination with separable journal-boxes E E, adapted to fit into and connect and support the ends of said cylindrical box and annular plates, substantially in the manner and for the purpose herein set forth.

2. The combination, with a metallic hub having on its outer face an annular recess, p, substantially as described, of the chambered nut H, adapted to catch and retain the waste lubricant escaping from the end of the journal-box, substantially in the manner herein set forth.

In testimony whereof I have signed my name to this specification in the presence of two subscribing witnesses.

JOHN DOUGLASS.

Witnesses:
A. W. STEIGER,
JOHN A. ELLIS.